(12) United States Patent
Shingai et al.

(10) Patent No.: US 7,227,832 B2
(45) Date of Patent: Jun. 5, 2007

(54) OPTICAL RECORDING MEDIUM AND METHOD OF RECORDING INFORMATION TO OPTICAL RECORDING MEDIUM

(75) Inventors: Hiroshi Shingai, Tokyo (JP); Tatsuya Kato, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 505 days.

(21) Appl. No.: 10/502,000

(22) PCT Filed: Jan. 29, 2003

(86) PCT No.: PCT/JP03/00861

§ 371 (c)(1),
(2), (4) Date: Jul. 20, 2004

(87) PCT Pub. No.: WO03/067580

PCT Pub. Date: Aug. 14, 2003

(65) Prior Publication Data

US 2005/0041568 A1 Feb. 24, 2005

(30) Foreign Application Priority Data

Feb. 8, 2002 (JP) .............................. 2002-032026

(51) Int. Cl.
*G11B 7/24* (2006.01)

(52) U.S. Cl. .................. 369/275.2; 369/53.2; 369/288; 428/64.4

(58) Field of Classification Search .. 369/275.1–275.5, 369/277–280, 288, 283, 53.2, 53.21, 47.19, 369/59.11, 53.41, 94; 430/270.13; 428/64.4, 428/64.5, 64.6
See application file for complete search history.

(56) References Cited

U.S. PATENT DOCUMENTS 7,170,848 B2 * 1/2007 Irie et al. ................. 369/275.2

(Continued)

FOREIGN PATENT DOCUMENTS

JP     2000298879     10/2000

(Continued)

OTHER PUBLICATIONS

Kato, Tatsuya et al., "The phase change optical disc with the data recording rate of 140 Mbps", Technical Digest ISOM'01, International Symposium on Optical Memory 2001, Oct. 16-19, 2001, 4 pgs.

*Primary Examiner*—Ali Neyzari
(74) *Attorney, Agent, or Firm*—Seed IP Law Group PLLC

(57) ABSTRACT

It is an object of the present invention to provide an optical recording medium that is suitable for recording information therein at a high velocity. An optical recording medium according to the present invention includes a recording layer formed of a phase change material and capable of recording data therein at a linear recording velocity equal to or higher than 10 m/sec, wherein Rtop satisfies the condition that it is larger than $\{11-(V/5)\}$ and smaller than $\{22-(2V/5)\}$, where Rtop (%) is a reflectivity of the crystal phase change material forming the recording layer and V (m/sec) is a target linear recording velocity. According to the present invention, since modulation (MOD) of 50% or more can be ensured, it is possible to effectively suppress the degradation of jitter caused by recording data at a high linear recording velocity equal to or higher than 10 m/sec.

9 Claims, 6 Drawing Sheets

U.S. PATENT DOCUMENTS

2004/0053166 A1* 3/2004 Shingai et al. ......... 430/270.13
2004/0213125 A1* 10/2004 Shingai et al. ................. 369/94

FOREIGN PATENT DOCUMENTS

JP 2002008269 1/2002
JP 2002015463 1/2002

* cited by examiner

OPTICAL RECORDING MEDIUM AND METHOD OF RECORDING INFORMATION TO OPTICAL RECORDING MEDIUM

BACKGROUND OF THE INVENTION

The present invention relates to an optical recording medium and particularly to an optical recording medium that is suited to record information therein at a high velocity. In addition, the present invention relates to a method of recording information to an optical recording medium that can record information therein at high data transfer rates.

DESCRIPTION OF THE PRIOR ART

Optical recording media typified by the CD and the DVD and the like have been widely used as recording media for recording digital data, and a widely used data recording format is a format wherein the lengths of recording marks along the track are modulated depending on the data to be recorded. For example, in a DVD-RW which is one type of optical recording medium whose data is user-rewritable, recording marks of lengths corresponding to 3T to 11T (where T is one clock cycle) are used to perform the recording of data.

When a recording mark is formed, a laser beam is shined along the tracks of the optical recording medium, thereby forming an amorphous region having a predetermined length in a recording layer included in an optical recording medium and the thus formed amorphous region is utilized as a recording mark. Other regions of the recording layer than the amorphous region are in crystal phase.

When a recording mark is to be formed in a recording layer, a laser beam whose power is set to a high level (a recording power) is projected onto the recording layer, thereby heating the recording layer to a temperature higher than the melting point thereof and the recording layer is then quickly cooled. As a result, the phase of the recording layer is changed from crystal phase to amorphous phase and a recording mark is formed in the recording layer. On the other hand, when a recording mark is to be erased, a laser beam whose power is set to a relatively low level (an erasing power) is projected onto the recording layer, thereby heating the recording layer to a temperature equal to or higher than the crystallization temperature thereof and the recording layer is then gradually cooled. As a result, the phase of the recording layer is changed from the amorphous phase to the crystal phase and the recording mark is erased. Therefore, if the power of the laser beam is modulated in this manner, it is possible to not only form a recording mark in an unrecorded region of the recording layer but also directly overwrite (direct-overwrite) a recording mark already formed in a region of the recording layer with a different recording mark.

In recent years, it has become highly desirable to achieve further increases in the data transfer rate with respect to optical recording media and in order to achieve this, it is effective to form a recording layer of a phase change material having a high crystallization velocity.

However, in a phase change material having a high crystallization velocity, the difference between the absolute reflectivity thereof in the crystal phase and that in the amorphous phase is generally small and when recorded data are reproduced, good jitter characteristics of the reproduced signal cannot be obtained. In addition, since the width of a recording mark becomes smaller as the linear recording velocity is increased in order to increase the data transfer rate, the degradation of jitter caused by decrease in difference in absolute reflection coefficient becomes pronounced as the linear recording velocity increases and the degradation of jitter becomes particularly serious when the linear recording velocity is equal to or higher than 10 m/sec.

Therefore, although the degradation of jitter caused by decrease in difference in absolute reflection coefficient is not so serious when the linear recording velocity is lower than 10 m/sec, the jitter characteristics drastically deteriorate due to decrease in difference in absolute reflection coefficient when the linear recording velocity is equal to or higher than 10 m/sec.

SUMMARY OF THE INVENTION

Accordingly, it is an object of the present invention to provide an optical recording medium that is suitable for recording information therein at a high velocity.

In addition, it is another object of the present invention to provide a method of recording information to an optical recording medium that can record information in the optical recording medium at high data transfer rates.

The difference in reflection coefficient between that of a recording layer formed of a phase change material in the crystal phase and that of the recording layer formed of the phase change material in the amorphous phase is generally expressed by a parameter called modulation (MOD) and a greater output amplitude can be obtained when information is reproduced from a recording layer having a higher modulation (MOD). Here, the modulation (MOD) is defined as follows.

$$MOD=(Rtop-Rbtm)/Rtop \tag{1}$$

where Rtop is the reflectivity of the phase change material in the crystal phase and Rbtm is the reflectivity of the phase change material in the amorphous phase. Here, Rtop and Rbtm are respectively defined as the reflectivity of a crystalline region and the reflectivity of an amorphous region when tracking of a condensed laser beam is performed along a groove.

As apparent from the equation (1), the modulation (MOD) can be increased by increasing the absolute difference between Rtop and Rbtm or decreasing Rtop. However, as described above, since the absolute difference between Rtop and Rbtm becomes small as the crystallizing velocity of a phase change material increases, it is necessary to decrease Rtop in order to increase the modulation (MOD). This can be achieved by adjusting the thickness of a dielectric layer(s), for example.

Based on this technical teaching, the inventors of the present invention found a preferable relationship between a target (attainable) linear recording velocity and the reflectivity of a recording layer in the crystal phase and completed the present invention.

Specifically, the above mentioned-object of the present invention can be accomplished by an optical recording medium comprising a recording layer formed of a phase change material and capable of recording data therein at a linear recording velocity equal to or higher than 10 m/sec, wherein Rtop satisfies the condition that it is larger than $\{11-(V/5)\}$ and smaller than $\{22-(2V/5)\}$, where Rtop (%) is a reflectivity of the crystal state of the phase change material forming the recording layer and V (m/sec) is a target linear recording velocity.

Further, the above mentioned object of the present invention can be accomplished by an optical recording medium comprising a recording layer formed of a phase change material and capable of recording data therein at a linear recording velocity equal to or higher than 10 m/sec and having recording condition setting information related to a linear recording velocity V (m/sec) to be set when recording data, wherein Rtop satisfies the condition that it is larger than $\{11-(V/5)\}$ and smaller than $\{22-(2V/5)\}$, where Rtop (%) is a reflectivity of the crystal state of the phase change material forming the recording layer.

According to the present invention, since modulation (MOD) of 50% or more can be ensured, it is possible to effectively suppress the degradation of jitter caused by recording data at a high linear recording velocity equal to or higher than 10 m/sec.

In a preferred aspect of the present invention, Rtop and V satisfy the condition that Rtop is larger than $\{11-(V/5)\}$ and smaller than $\{20-(4V/11)\}$.

According to this preferred aspect of the present invention, since modulation (MOD) of 55% or more can be ensured, it is possible to more effectively suppress the degradation of jitter caused by recording data at a high linear recording velocity equal to or higher than 10 m/sec.

In a further preferred aspect of the present invention, Rtop and V satisfy a condition that Rtop is larger than $\{11-(V/5)\}$ and smaller than $\{18.3-(V/3)\}$.

According to this preferred aspect of the present invention, since modulation (MOD) of 60% or more can be ensured, it is possible to more effectively suppress the degradation of jitter caused by recording data at a high linear recording velocity equal to or higher than 10 m/sec.

The above object of the present invention can be also accomplished by a method of recording information to an optical recording medium comprising a recording layer formed of a phase change material whose reflectivity is Rtop (%) when it is in a crystal phase, which method records information under the condition that Rtop is larger than $\{11-(V/5)\}$ and smaller than $\{22-(2V/5)\}$, where V (m/sec) is a linear recording velocity.

According to the present invention, since modulation (MOD) of 50% or more can be ensured, it is possible to effectively suppress the degradation of jitter caused by recording data at a high linear recording velocity equal to or higher than 10 m/sec.

In a preferred aspect of the present invention, information is recorded under the condition that Rtop is larger than $\{11-(V/5)\}$ and smaller than $\{20-(4V/11)\}$.

According to this preferred aspect of the present invention, since modulation (MOD) of 55% or more can be ensured, it is possible to more effectively suppress the degradation of jitter caused by recording data at a high linear recording velocity equal to or higher than 10 m/sec.

In a further preferred aspect of the present invention, information is recorded under the condition that Rtop is larger than $\{11-(V/5)\}$ and smaller than $\{18.3-(V/3)\}$.

According to this preferred aspect of the present invention, since modulation (MOD) of 60% or more can be ensured, it is possible to more effectively suppress the degradation of jitter caused by recording data at a high linear recording velocity equal to or higher than 10 m/sec.

DESCRIPTION OF THE PREFERRED EMBODIMENT

A preferred embodiment of the present invention will be explained in detail with reference to the drawings.

As pointed out above, it is necessary to increase the crystallizing velocity of a phase change material forming a recording layer in order to record data in an optical recording medium at a high data transfer rate and it is possible to see a substantially constant relationship between linear recording velocities attainable by phase change materials and absolute difference between Rtop and Rbtm thereof.

Figure 1:
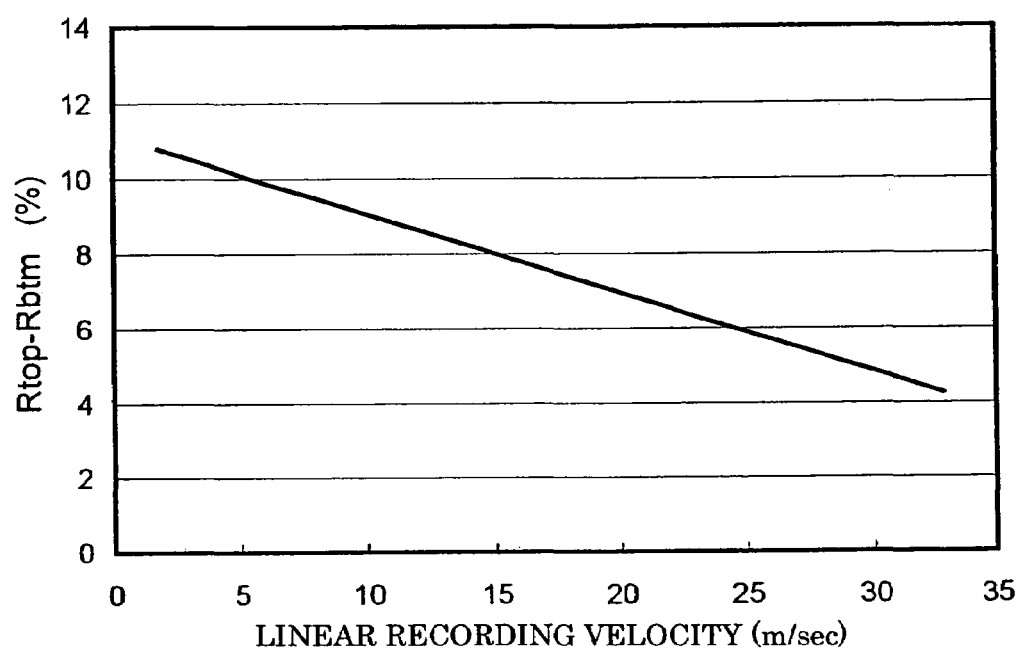
FIG. 1 is a graph showing the relationship between linear recording velocities attainable by phase change materials and absolute difference (Rtop–Rbtm) between Rtop and Rbtm thereof.

FIG. 1 is a graph showing the relationship between linear recording velocities attainable by phase change materials and absolute difference (Rtop–Rbtm) between Rtop and Rbtm thereof.

It can be seen from FIG. 1 that the absolute difference between Rtop and Rbtm of a phase change material decreases as the attainable linear recording velocity of the phase change material increases and that this tendency is substantially linear. This linear relationship can be expressed by the following equation (2):

$$R\text{top}-R\text{btm}=11-(V/5) \tag{2}$$

On the other hand, as pointed out above, in order to obtain a considerably high output amplitude when reproducing data, it is effective to increase the modulation (MOD) of the recording layer. In particular, since the width of a recording mark becomes smaller as the linear recording velocity increases, it is necessary to considerably increase the modulation (MOD) of the recording layer in the case where the linear recording velocity is equal to or higher than 10 m/sec. Concretely, in the case where the linear recording velocity is equal to or higher than 10 m/sec, modulation (MOD) of 50% or more is required in order to obtain considerably high output amplitude and the modulation (MOD) is preferably equal to or higher than 55%, more preferably equal to or higher than 60%.

The conditions required for achieving modulation (MOD) of 50% or more can be derived from formulae (1) and (2). Specifically, modulation (MOD) of 50% or more can be ensured if the reflectivity (Rtop) of the crystal phase change material satisfies the following formula (3).

$$R\text{top}<22-(2V/5) \tag{3}$$

Further, since it follows from formula (1) that the lower limit of Rtop is obtained when the reflectivity (Rbtm) of the amorphous phase change material becomes zero, Rtop can be expressed by the following formula (4).

$$R\text{top}>11-(V/5) \tag{4}$$

Moreover, the conditions required for achieving modulation (MOD) of 55% or more and those required for achieving modulation (MOD) of 60% or more can be derived from formulae (1) and (2). Specifically, modulation (MOD) of 55% or more can be ensured if the reflectivity (Rtop) of the crystal phase change material satisfies the following formula (5) and modulation (MOD) of 60% or more can be ensured if the reflectivity (Rtop) of the crystal phase change material satisfies the following formula (6).

$$R\text{top} < 20 - (4V/11) \tag{5}$$

$$R\text{top} < 18.3 - (V/3) \tag{6}$$

Figure 2:
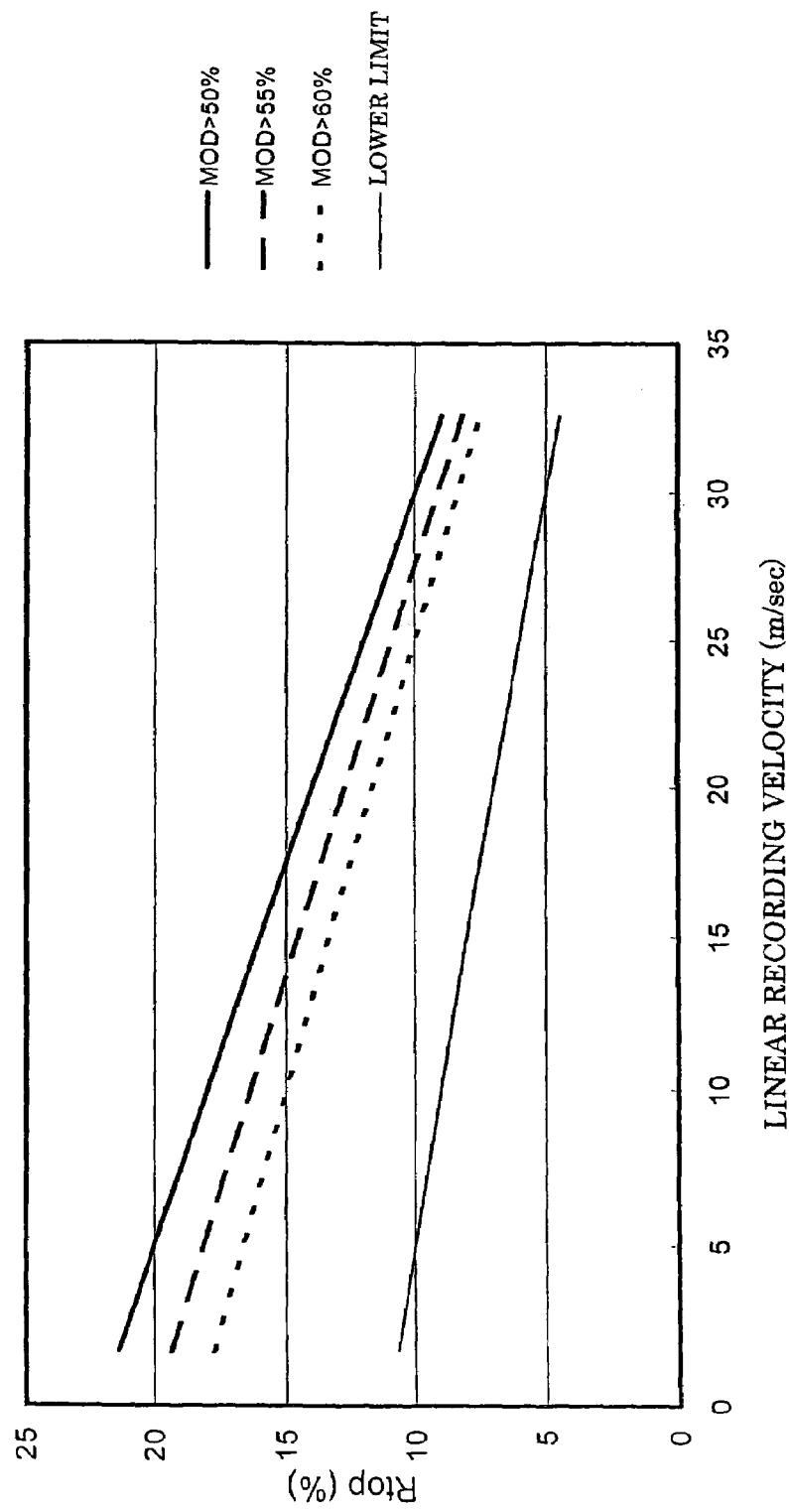
FIG. 2 is a graph showing the relationship between linear recording velocities attainable when modulation (MOD) is 50%, 55% or 60%, and the reflectivity (Rtop) of a crystal phase change material.

FIG. 2 is a graph corresponding to the above formulae (3) to (6) showing the relationship between linear recording velocities attainable when the modulation (MOD) is 50%, 55% or 60%, and the reflectivity (Rtop) of a crystal phase change material.

As apparent from FIG. 2, the value to be set as the reflectivity (Rtop) of a crystal phase change material decreases as the attainable linear recording velocity increases. Concretely, in the case where a data transfer rate of 70 Mbps taking the format efficiency to be approximately 80% is achieved using the (1,7) RLL modulation code, since the required linear recording velocity is 10.5 m/sec, the value of Rtop required for achieving modulation (MOD) of 50% or more is 8.7% to 14.7%, the value of Rtop required for achieving modulation (MOD) of 55% or more is 8.7% to 15.9% and the value of Rtop required for achieving modulation (MOD) of 60% or more is 8.7% to 14.5%. Similarly, in the case where a data transfer rate of 140 Mbps taking the format efficiency to be approximately 80% is achieved using the (1,7) RLL modulation code, since the required linear recording velocity is 21.0 m/sec, the value of Rtop required for achieving modulation (MOD) of 50% or more is 6.4% to 12.9%, the value of Rtop required for achieving modulation is (MOD) of 55% or more is 6.4% to 11.7% and the value of Rtop required for achieving modulation (MOD) of 60% or more is 6.4% to 10.7%.

Next, the physical structure of an optical recording medium that is a preferred embodiment of the present invention.

Figure 3:
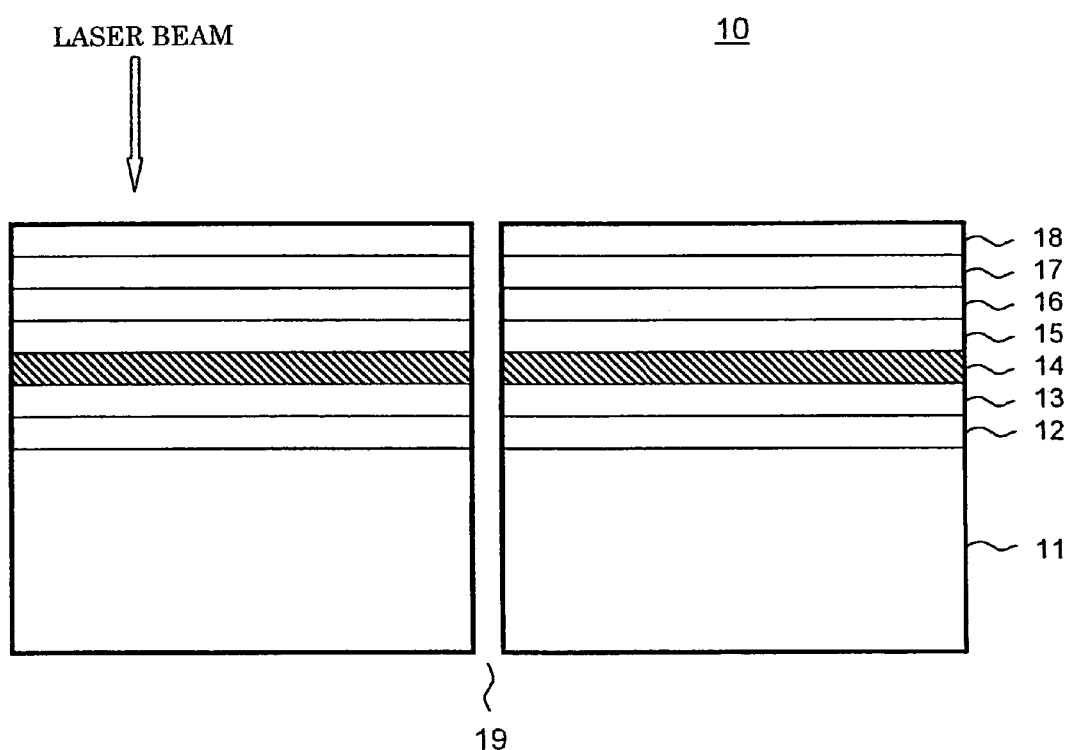
FIG. 3 is a drawing schematically showing the structure of an optical recording medium 10 that is a preferred embodiment of the present invention.

FIG. 3 is a drawing schematically showing the structure of an optical recording medium 10 that is a preferred embodiment of the present invention.

As shown in FIG. 3, an optical recording medium 10 includes a substrate 11, a reflective layer 12 formed on the substrate 11, a second dielectric layer 13 formed on the reflective layer 12, a recording layer 14 formed on the second dielectric layer 13, a barrier layer 15 formed on the recording layer 14, a first dielectric layer 16 formed on the barrier layer 15, a heat radiation layer 17 formed on the first dielectric layer 16 and a light transmission layer 18 formed on the heat radiation layer 17. A hole 19 is provided in the center of the optical recording medium 10. When recording data onto an optical recording medium 10 with such a structure and reproducing data therefrom, a laser beam is projected from the side of the light transmission layer 18.

The substrate 11 serves as a support for ensuring the mechanical strength required by the optical recording medium 10 and it is preferable to set the thickness thereof to be 1.1 mm. While the material for forming the substrate 11 is not particularly limited, polycarbonate can be used to from the substrate 11.

The reflective layer 12 serves to reflect the laser beam projected onto the recording layer 14 via the light transmission layer 18 and emit it via the light transmission layer 18 and the thickness thereof is preferably set to be 10 to 300 nm. The material for forming the reflective layer 12 is not particularly limited but the reflective layer 12 is preferably formed of an alloy containing Ag as a primary component.

The second dielectric layer 13 mainly serves as a protective layer for the recording layer 14 formed thereon and the thickness thereof is preferably set to be 2 to 50 nm. While the material for forming the second dielectric layer 13 is not particularly limited, $Al_2O_3$, a mixture of ZnS and $SiO_2$, $CeO_2$, $Y_2O_3$, AlN or the like can be used for forming the second dielectric layer 13.

The recording layer 14 is formed of a phase change material and data are recorded therein utilizing the difference in reflection coefficient between the case where the recording layer 14 is in the crystal phase and the case where it is in the amorphous phase. The reflectivity in these states are set by adjusting the composition of the phase change material forming the recording layer 14 and, as explained above, they are determined depending upon the target (attainable) linear recording velocity. The target (attainable) linear recording velocity is recorded in the optical recording medium 10 as recording condition setting information and when data are to be recorded, the recording condition setting information is read by a drive and data are recorded at a linear recording velocity determined based on the thus read recording condition setting information. Here, the recording condition setting information refers to information used for identifying various conditions required for recording data on the optical recording medium 10 concretely including a linear recording velocity, the power of the laser beam, a pulse train pattern described later in detail and the like. The recording condition setting information may be recorded in the optical recording medium 10 in the form of wobbles or prepits or may be recorded in the optical recording medium 10 when recording data. Further, the recording condition setting information is not limited to specifically designated conditions required to record data but may also include recording conditions designated by specifying one of several conditions stored in advance in the information recording apparatus.

In order to change a region of the recording layer 14 in the crystal phase to the amorphous phase, the power of a laser beam projected from the side of the light transmission layer 18 is modulated in accordance with a pulse waveform having an amplitude extending from a recording power (Pw) to a bottom power (Pb) so as to heat the recording layer 14 to a temperature higher than the melting point thereof and then quickly cool it by setting the power of the laser beam to the bottom power (Pb). As a result, the phase of the region melted by the laser beam having the recording power (Pw) is changed to the amorphous phase, thereby forming a recording mark. On the other hand, in order to crystallize a region of the recording layer 14 in the amorphous phase, the recording layer 14 is heated to a temperature equal to or higher than the crystallization temperature thereof by setting the power of the laser beam projected from the side of the light transmission layer 18 to an erasing power (Pe). The region of the recording layer 14 heated to the temperature equal to or higher than the crystallization temperature thereof is therefore crystallized during the gradual cooling that follows.

Here, the recording power (Pw), the erasing power (Pe) and the bottom power (Pb) are set so that Pw is higher than Pe and Pe is equal to or higher than Pb. Therefore, if the power of the laser beam is modulated in this manner, it is possible to not only form a recording mark in an unrecorded region of the recording layer 14 but also directly overwrite (direct-overwrite) a recording mark already formed in a region of the recording layer with a different recording mark.

The material for forming the recording layer 14 is not particularly limited but an SbTe eutectic crystal system material is preferably used for forming the recording layer 14. As the SbTe eutectic crystal system material, InSbTeGeTb is preferable. The thickness of the recording layer 14 is preferably set to be 5 to 30 nm.

Similarly to the second dielectric layer 13, the first dielectric layer 16 mainly serves as a protective layer for the recording layer 14 and the thickness thereof is preferably set to be 10 to 300 nm. The material for forming the first dielectric layer 16 is not particularly limited but a mixture of ZnS and $SiO_2$ is preferably used for forming the first dielectric layer 16.

The barrier layer 15 serves to prevent S (sulfur) contained in the first dielectric layer 16 from reaching the recording layer 14 and the thickness thereof is preferably set to be 2 to 20 nm. While the material for forming the barrier layer 15 is not particularly limited, $Al_2O_3$, SiN, $Y_2O_3$ or the like can be used for forming the barrier layer 15. However, in the present invention, it is not absolutely necessary to provide the barrier layer 15 and the barrier layer 15 may be omitted.

The heat radiation layer 17 serves to effectively radiate heat applied to the recording layer 14 and to enlarge the power margin of the optical recording medium 10. Therefore, it is necessary for the heat radiation layer 17 to have a thermal conductivity higher than at least the first dielectric layer 16 and the heat radiation layer 17 is preferably formed of $Al_2O_3$, AlN or the like. The thickness thereof is preferably set to be 10 to 200 nm and more preferably set to be 30 to 100 nm. However, in the present invention, it is not absolutely necessary to provide the heat radiation layer 17 and the heat radiation layer 17 may be omitted.

The light transmission layer 18 constitutes the incidence plane of the laser beam and the thickness thereof is preferably set to be 10 to 300 µm and more preferably set to be 50 to 150 µm. The material for forming the light transmission layer 18 is not particularly limited but an ultraviolet ray curable resin is preferably used for forming the light transmission layer 18.

Next, a drive capable of recording data in the optical recording medium 10 according to this embodiment will be described.

Figure 4:
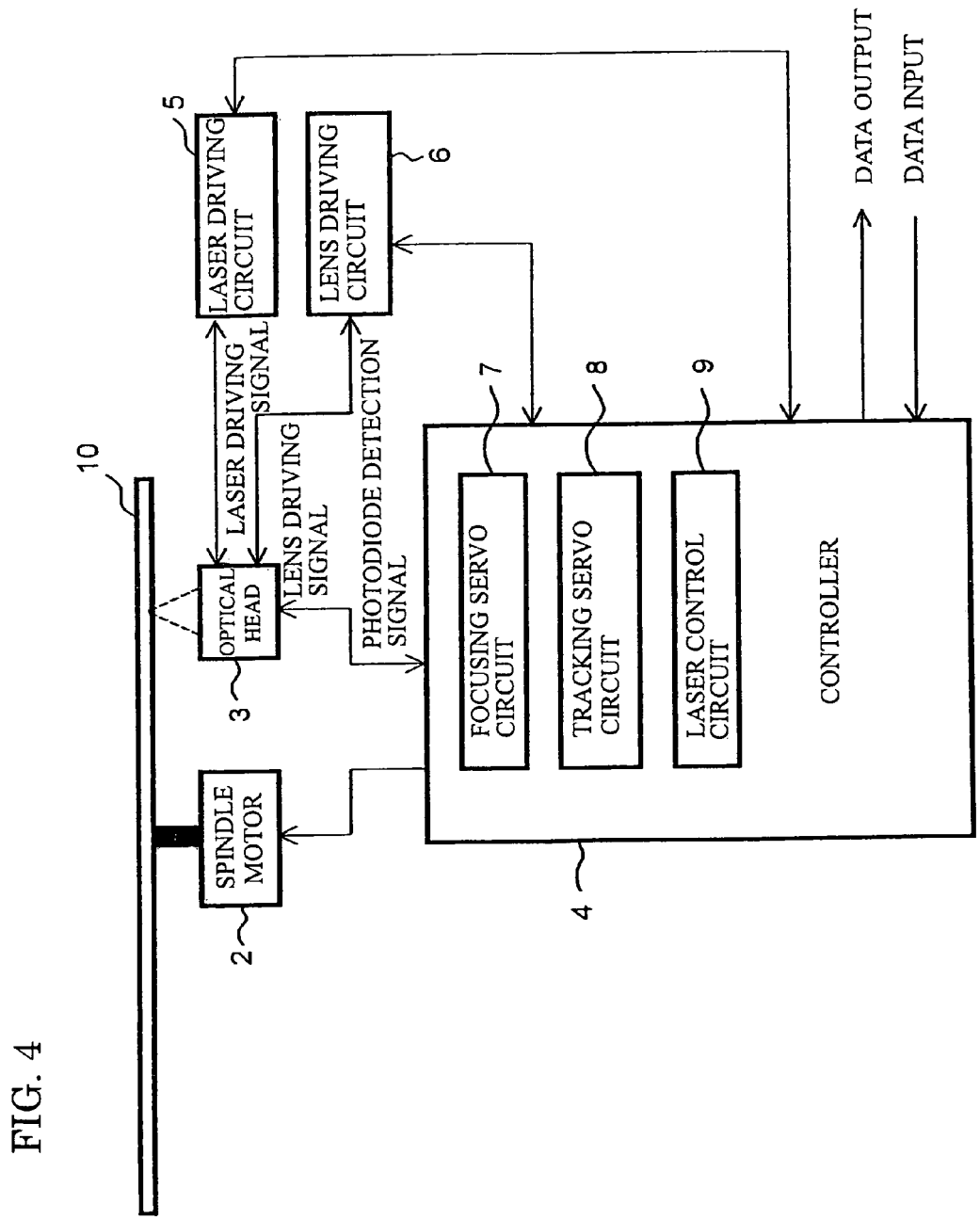
FIG. 4 is a drawing schematically showing the major components of a drive.

FIG. 4 is a drawing schematically showing the major components of the drive.

As shown in FIG. 4, the drive is equipped with a spindle motor 2 for rotating an optical recording medium 10, an optical head 3 for shining a laser beam onto the optical recording medium 10 and receiving the laser beam reflected from the optical recording medium 10, a controller 4 for controlling the operation of the spindle motor 2 and the optical head 3, a laser driving circuit 5 that supplies a laser driving signal to the optical head 3, and a lens driving circuit 6 that supplies a lens driving signal to the optical head 3.

Moreover, as shown in FIG. 4, the controller 4 includes a focusing servo circuit 7, a tracking servo circuit 8, and a laser control circuit 9. When the focusing servo circuit 7 is activated, the focus is aligned with the recording surface of the rotating optical recording medium 10, and when the tracking servo circuit 8 is activated, the spot of the laser beam begins to automatically track the eccentric signal track of the optical recording medium 10. The focusing servo circuit 7 and tracking servo circuit 8 are provided with an auto gain control function for automatically adjusting the focusing gain and an auto gain control function for automatically adjusting the tracking gain, respectively. In addition, the laser control circuit 9 is a circuit that generates the laser driving signal supplied by the laser driving circuit 5 and generates a laser driving signal based on recording condition setting information recorded on the optical recording medium 10.

Note that the focusing servo circuit 7, tracking servo circuit 8 and laser control circuit 9 need not be circuits incorporated in the controller 4 but can instead be components separate of the controller 4. Moreover, they need not be physical circuits but can instead be accomplished by software programs executed in the controller 4.

When data are to recorded in the optical recording medium 10 according to this embodiment using the thus constituted drive, the recording condition setting information recorded on the optical recording medium 10 is read and a linear recording velocity, the power of the laser beam, a pulse train pattern and the like are determined based on the recording condition setting information. The pulse train pattern to be used is not particularly limited but considering that the present invention is particularly effective in the case of recording data at a high linear recording velocity, the (1,7)RLL modulation code is preferably used. In the (1,7) RLL modulation code, recording marks of lengths corresponding to 2T to 8T are formed in the recording layer 14.

Figure 5:
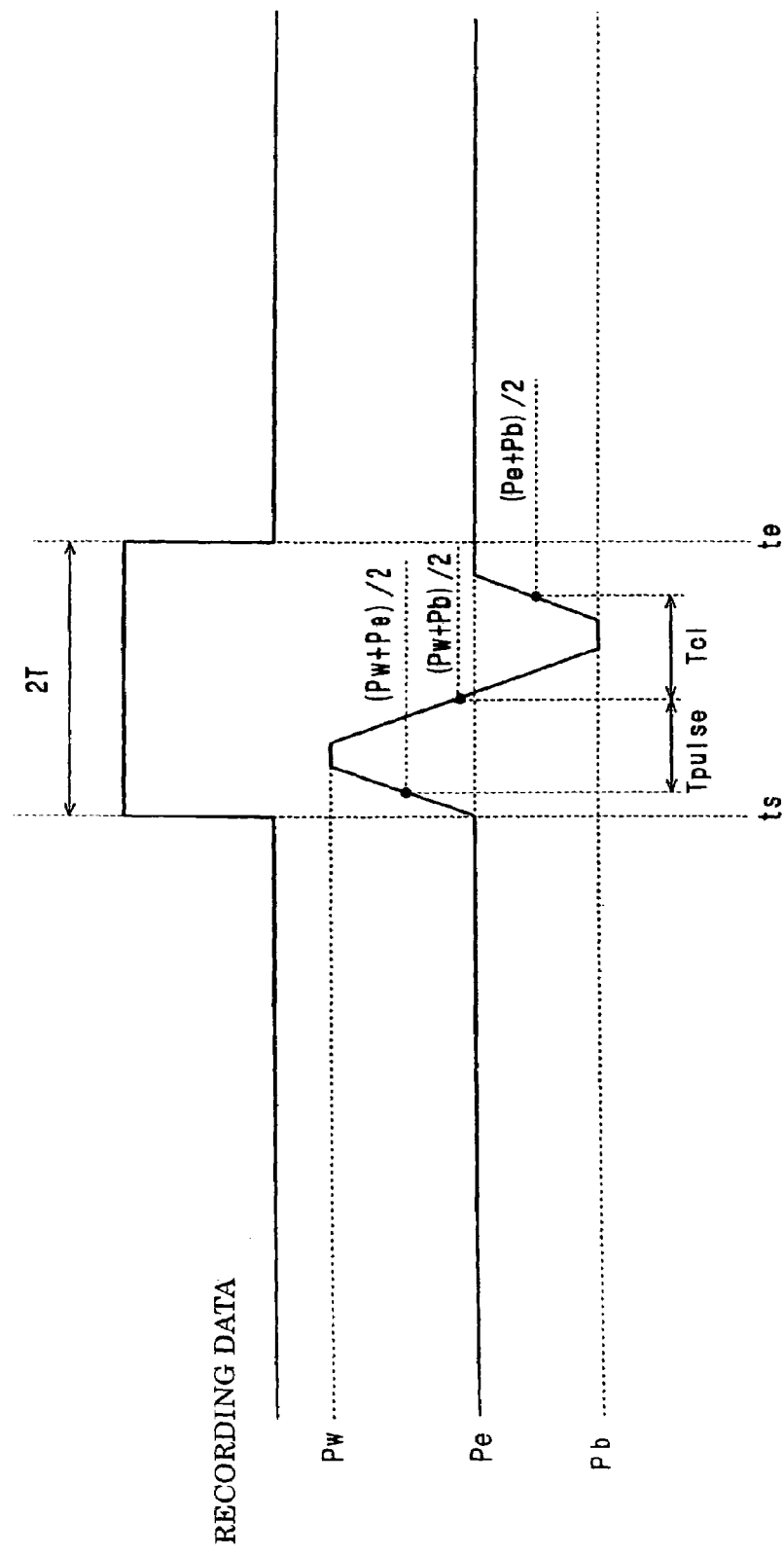
FIG. 5 is a drawing illustrating the pulse train pattern in the case of forming a recording mark of a length corresponding to 2T.

FIG. 5 is a drawing illustrating the pulse train pattern in the case of forming a recording mark of a length corresponding to 2T.

As shown in FIG. 5, when forming a recording mark of a length corresponding to 2T, the number of pulses in the laser beam is set to 1. Here, the number of pulses in the laser beam is defined by the number of times the power of the laser beam shined during recording is raised to Pw. More specifically, taking the time $t_s$ to be the timing at which the laser beam is positioned at the starting point of the recording mark and the time $t_e$ to be the timing at which the laser beam is positioned at the ending point of the recording mark, during the period from the time $t_s$ to the time $t_e$, the laser beam power is first set to Pw and then set to the power Pb. Here, the laser beam power before the time $t_s$ is set to Pe and the power of the laser beam begins to rise at the time $t_s$. In addition, the laser beam power at the time $t_e$ is set to Pe or Pb.

During the interval $T_{pulse}$, the recording layer 14 of the optical recording medium 1 receives a large amount of energy and its temperature exceeds the melting point, and during the interval $T_{cl}$, the recording layer 14 of the optical recording medium 1 is rapidly cooled. Thereby, a recording mark of a length corresponding to 2T is formed in the recording layer 14 of the optical recording medium 1.

Similarly to the case of forming a recording mark of a length corresponding to 2T, in the case of forming another recording mark of a length corresponding to one of 3T to 8T, the power of a laser beam is set to Pw, Pe or Pb and a recording mark of a predetermined length is formed using predetermined pulses.

As described above, according to this embodiment, since it is possible to effectively suppress the degradation of jitter caused by recording data at a high linear recording velocity, in particular, at a linear recording velocity equal to or higher than 10 m/sec, data can be recorded at higher data transfer rates.

The present invention is in no way limited to the aforementioned embodiment, but rather various modifications are possible within the scope of the invention as recited in the claims, and these are naturally included within the scope of the invention.

For example, although the foregoing preferred embodiment was explained with regard to the optical recording medium 10 having the configuration shown in FIG. 3, the optical recording medium according to the present invention is not limited to the optical recording medium having such a configuration.

As described above, according to the present invention, since it is possible to effectively suppress the degradation of jitter caused by recording data at a high linear recording velocity, in particular, at a linear recording velocity equal to or higher than 10 m/sec, data can be recorded at higher data transfer rates.

WORKING EXAMPLE

First, optical recording media 10-1 to 10-4 like that shown in FIG. 3 that had a substrate 11 consisting of polycarbonate and having a thickness of approximately 1.1 mm, a reflective layer 12 consisting of an alloy containing Ag as a primary component and having a thickness of 100 nm, a second dielectric layer 13 consisting of a mixture of ZnS and $SiO_2$ (mole ratio of 50:50) and having a thickness of 3 nm, a recording layer 14 containing InSbTeGeTb and having a thickness of 14 nm, a barrier layer 15 consisting of $Al_2O_3$ and having a thickness of 5 nm, a first dielectric layer 16 consisting of a mixture of ZnS and $SiO_2$ (mole ratio of 80:20), a heat radiation layer 17 consisting of AlN and having a thickness of 100 nm, and a light transmission layer 18 consisting of an ultraviolet ray curable resin and having a thickness of 100 μm were prepared. These optical recording media were different from each other only in the thickness of the first dielectric layer 16 and, as a result, the reflectivity (Rtop) of their recording layers in a crystal phase were different from each other. The thickness of the first dielectric layer 16 of the optical recording medium 10-1 was 30 nm, the thickness of the first dielectric layer 16 of the optical recording medium 10-2 was 40 nm, the thickness of the first dielectric layer 16 of the optical recording medium 10-3 was 42 nm and the thickness of the first dielectric layer 16 of the optical recording medium 10-4 was 45 nm. The phase change material forming each of the recording layers had a crystallization velocity optimized in the case of recording data at a linear recording velocity of 21.0 m/sec, namely, at a data transfer rate of 140 Mbps taking the format efficiency to be 80%.

Random signals consisting of recording marks of lengths corresponding to 2T to 8T in the (1,7)RLL modulation code were recorded in each of the optical recording media 10-1 to 10-4 under the conditions shown in Table 1.

TABLE 1

| | |
|---|---|
| Clock frequency | 262.5 MHz |
| Clock period (1T) | 3.8 nsec |
| Linear recording velocity (CLV) | 21.0 m/sec |
| Modulation code | (1,7) RLL |
| Data transfer rate | 175 Mbps |
| Format efficiency | 80% |
| Data transfer rate (taking efficiency into account) | 140 Mbps |
| Channel bit length | 0.12 μm/bit |
| Numerical aperture | 0.85 |
| Laser wavelength | 405 nm |
| Pw | 7.0 to 8.0 mW |
| Pe | 2.2 mW |
| Pb | 0.1 mW |

Then, clock jitter of the random signals recorded in each of the optical recording media 10-1 to 10-4 was measured.

When clock jitter was measured, the fluctuation σ of a reproduced signal was measured using a time interval analyzer and the clock jitter was calculated as σ/Tw, where Tw was one clock period. The results of the measurement are shown in Table 2. In Table 2, the reflectivity (Rtop) of the recording layer 14 in a crystal phase is shown for each of the optical recording media 10-1 to 10-4.

TABLE 2

| | Jitter | Rtop |
|---|---|---|
| Optical Recording Medium 10-1 | 11.8% | 12.5% |
| Optical Recording Medium 10-2 | 10.9% | 11.0% |
| Optical Recording Medium 10-3 | 10.4% | 7.3% |
| Optical Recording Medium 10-4 | 12.7% | 17.0% |

Here, the reflectivity (Rtop) of each of the optical recording media 10-1 to 10-4 was measured as follows.

First, a plurality of media for measurement including only reflective layers 12 having different thicknesses were fabricated and a laser beam having the same wavelength as that of the laser beam to be used for recording and reproducing data was projected onto a mirror region (a flat region formed with no groove or pit) of each of the media for measurement and the reflectivity thereof was measured using a spectrophotometer, thereby obtaining the relationship between the thickness of the reflective layer 12 and the reflectivity for each of the media for measurement. Further, the laser beam which was to be used for recording and reproducing data and whose power was set to a reproducing power was focused onto the mirror region of each of the media for measurement using an evaluation apparatus and a sum signal output voltage value was measured for each of the media for measurement, thereby obtaining the relationship between the thickness of the reflective layer 12 and the sum signal output voltage value for each of the media for measurement.

Then, the relationship between the reflectivity and the sum signal output voltage value was derived for each of the media for measurement from the thus obtained relationship between the thickness of the reflective layer 12 and the reflectivity and relationship between the thickness of the reflective layer 12 and the sum signal output voltage value for each of the media for measurement.

Further, the laser beam whose power was set to the reproducing power was tracked along the groove on a region of the recording layer 14 in a crystal phase of each of the optical recording media 10-1 to 10-4 to obtain a sum signal output voltage value and the reflectivity of the region of the recording layer 14 was calculated from the thus obtained sum signal output voltage value and the relationship between the reflectivity and the sum signal output voltage value. The result was defined as Rtop. Rbtm can be calculated in a similar manner.

As shown in Table 2, jitter of the random signals became better as the reflectivity (Rtop) of the recording layer 14 in a crystal phase of the optical recording medium was lower. Then, a graph showing the relationship between the reflectivity (Rtop) of the recording layer 14 in a crystal phase and jitter was made using the values shown in Table 2.

Figure 6:
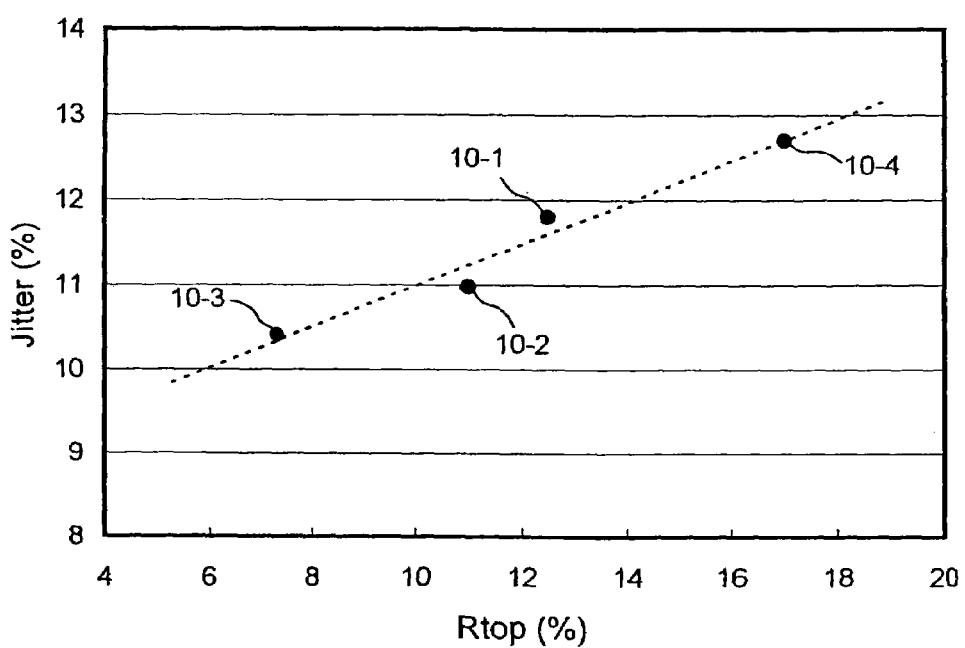
FIG. 6 is a graph showing the relationship between the reflectivity (Rtop) of a crystal phase change material and jitter.

FIG. 6 is a graph showing the relationship between the reflectivity (Rtop) of the recording layer 14 in a crystal phase and jitter.

As shown in FIG. 6, it was found that there was a constant relationship between the reflectivity (Rtop) of the recording layer 14 in a crystal phase and jitter and jitter decreased as the reflectivity (Rtop) of the recording layer 14 in a crystal phase was lower. Here, it was found that the reflectivity of the optical recording medium 10-1 satisfied the above mentioned formula (3) and jitter was 11.8%, i.e., equal to or lower than the practical upper limit 12%, and it was found that the reflectivity of the optical recording medium 10-2 satisfied the above mentioned formula (5) and jitter was 10.9%, i.e., equal to or lower than 11%. Further, it was found that the reflectivity of the optical recording medium 10-3 satisfied the above mentioned formula (6) and jitter was 10.4%, i.e., equal to or lower than 10.5%. To the contrary, it was found that the reflectivity of the optical recording medium 10-4 did not satisfy the above mentioned formula (3) and jitter exceeded the practical upper limit 12%.

The invention claimed is:

1. An optical recording medium comprising a recording layer formed of a phase change material and capable of recording data therein at a linear recording velocity equal to or higher than 10 m/sec, wherein Rtop satisfies the condition that it is larger than $\{11-(V/5)\}$ and smaller than $\{22-(2V/5)\}$, where Rtop (%) is a reflectivity of the crystal state of the phase change material forming the recording layer and V (m/sec) is a target linear recording velocity.

2. An optical recording medium in accordance with claim 1, wherein Rtop and V satisfy the condition that Rtop is larger than $\{11-(V/5)\}$ and smaller than $\{20-(4V/11)\}$.

3. An optical recording medium in accordance with claim 1, wherein Rtop and V satisfy the condition that Rtop is larger than $\{11-(V/5)\}$ and smaller than $\{18.3-(V/3)\}$.

4. An optical recording medium comprising a recording layer formed of a phase change material and capable of recording data therein at a linear recording velocity equal to or higher than 10 m/sec and having recording condition setting information related to a linear recording velocity V (m/sec) that should be set when recording data, wherein Rtop satisfies the condition that it is larger than $\{11-(V/5)\}$ and smaller than $\{22-(2V/5)\}$, where Rtop (%) is a reflectivity of the crystal state of the phase change material forming the recording layer.

5. An optical recording medium in accordance with claim 4, wherein Rtop and V satisfy the condition that Rtop is larger than $\{11-(V/5)\}$ and smaller than $\{20-(4V/11)\}$.

6. An optical recording medium in accordance with claim 4, wherein Rtop and V satisfy the condition that Rtop is larger than $\{11-(V/5)\}$ and smaller than $\{18.3-(V/3)\}$.

7. A method of recording information to an optical recording medium comprising a recording layer formed of a phase change material whose reflectivity is Rtop (%) when it is in a crystal phase, which method records information under the condition that Rtop is larger than $\{11-(V/5)\}$ and smaller than $\{22-(2V/5)\}$, where V (m/sec) is a linear recording velocity.

8. A method of recording information to an optical recording medium in accordance with claim 7, wherein information is recorded under the condition that Rtop is larger than $\{11-(V/5)\}$ and smaller than $\{20-(4V/11)\}$.

9. A method of recording information to an optical recording medium in accordance with claim 7, wherein information is recorded under the condition that Rtop is larger than $\{11-(V/5)\}$ and smaller than $\{18.3-(V/3)\}$.

* * * * *